United States Patent [19]

Böhner et al.

[11] 4,142,585
[45] Mar. 6, 1979

[54] DIGGER ASSEMBLY FOR ROOT-CROP HARVESTER

[75] Inventors: Günter Böhner; Friedhelm Wolfram, both of Weimar, German Democratic Rep.

[73] Assignee: Veb Weimar Werk, Stammbetrieb des Veb Weimar Kombinat, Weimar, German Democratic Rep.

[21] Appl. No.: 834,867

[22] Filed: Sep. 20, 1977

[51] Int. Cl.² .................................... A01D 13/00
[52] U.S. Cl. ............................ 171/82; 171/140; 171/141
[58] Field of Search ............ 171/82, 83, 84, 87, 171/88, 124, 134, 135, 140, 141; 56/17.2

[56] References Cited
U.S. PATENT DOCUMENTS

| 30,253 | 10/1860 | Scuddier | 171/83 |
|---|---|---|---|
| 1,023,736 | 4/1912 | Harman | 171/141 |
| 1,714,915 | 5/1929 | Ledbetter | 171/141 |
| 2,452,418 | 10/1948 | Zuckerman | 171/141 |
| 2,949,004 | 8/1960 | Jones | 56/503 |
| 3,841,071 | 10/1974 | Pinkham et al. | 56/225 |
| 3,992,860 | 11/1976 | Bobbitt, Jr. | 56/225 |

FOREIGN PATENT DOCUMENTS

| 2031518 | 1/1972 | Fed. Rep. of Germany | 171/141 |
|---|---|---|---|
| 726449 | 3/1955 | United Kingdom | 171/141 |

*Primary Examiner*—Russell R. Kinsey
*Assistant Examiner*—Paul J. Hirsch
*Attorney, Agent, or Firm*—Karl F. Ross

[57] ABSTRACT

Within an agricultural vehicle for harvesting root crops, such as potatoes, a frame is suspended and has its bottom formed by a screen conveyor, its front end carrying a set of plows preceded by pilot wheels which ride respective furrow slices and control the elevation of the frame. The suspension for the frame comprises a pair of cables, one of them extending transversely over two rollers and engaging the rear of the frame at opposite ends while the other rises from a forward part of the frame and is hydraulically tensionable for raising or lowering same. The frame is limited for movement both longitudinally and transversely with reference to the vehicle body, its mobility in any direction being restricted by a pair of rearwardly projecting lateral guide rollers confined between vertical tracks and horizontal abutments; one of these guide rollers has a trapezoidal profile coacting with a similarly shaped track surface while the other guide roller is substantially cylindrical.

10 Claims, 3 Drawing Figures

DIGGER ASSEMBLY FOR ROOT-CROP HARVESTER

FIELD OF THE INVENTION

Our present invention relates to an agricultural vehicle for the harvesting of root crops, such as potatoes, and more particularly to a digger assembly designed to remove the potatoes or other roots from furrow slices in which they have ripened.

BACKGROUND OF THE INVENTION

Various devices are known for digging up furrow slices to extract such root crops therefrom. These devices, generally, comprise a screen conveyor mounted behind a plow within the body of a vehicle which may be self-propelled or towed, the plow projecting from the open front of the vehicle while the conveyor delivers the harvested roots at its rear to a bin on the same or on a following vehicle.

It has already been proposed (see Pat. No. 35,146 of the German Democratic Republic) to mount such a screen conveyor for pivotal movement about a horizontal axis whose location is fixed with reference to the vehicle, thereby allowing a tilting thereof under the control of a hydraulic jack. G.D.R. Pat. No. 65,490 describes an arrangement for controlling the tilt of a plow, mounted at the front end of a trailer-borne frame which carries the forward support roller or rollers of the conveyor, with the aid of a pilot member carried by an associated tractor and rotatable with reference to the trailer body. An hydraulic linkage connecting a conveyor-and-plow assembly with rollers engaging the furrow slices is known from G.D.R. Pat. No. 82,230. Pat. No. 1,214,031 of the German Federal Republic describes a hydraulic hoist for elevating the plow assembly with reference to the vehicle body.

OBJECT OF THE INVENTION

An object of our present invention is to provide a simple and efficient digger assembly of the character set forth which faithfully follows the terrain to be worked, even in the presence of obstacles such as rocks in the path of the vehicle or in the face of unsteady manuevering by its driver.

Another, more particular object is to provide an assembly of this type which allows for the simultaneous working of as many as three furrow slices.

SUMMARY OF THE INVENTION

In accordance with our present invention, a generally horizontal frame bounded at its bottom by a screen conveyor is supported within the forwardly open vehicle body by a three-point suspension including a first and a second cable. The first cable passes in transverse direction over one or more idlers above the frame while being anchored to opposite sides of a rear frame part, the second cable being longitudinally spaced from the first one and rising from a forward frame part to the roof of the vehicle. This mode of suspension affords limited universal freedom of motion to the frame with reference to the vehicle body, such relative mobility being restricted by a lost-motion coupling therebetween. The front end of the frame carries a plurality of parallel plows, designed to dig up respective furrow slices, preceded by respective pilot wheels which ride these furrow slices and control the position of the frame.

Pursuant to a more particular feature of our invention, the lost-motion coupling comprises a pair of guide rollers on the frame, preferably on its rear part, bracketed with clearance by a pair of generally vertical tracks on the vehicle body. Advantageously, for lateral as well as longitudinal guidance, one of these rollers has a rim with radially outwardly converging flanks, i.e. a trapezoidal or triangular profile, coacting with similarly inclined cheeks of the associated track; the other guide roller preferably has a substantially cylindrical rim, being thus without lateral guide function so as not unduly to inhibit the rocking of the frame about its imaginary pivotal axis.

BRIEF DESCRIPTION OF THE DRAWING

The above and other features of our invention will now be described in detail with reference to the accompanying drawing in which.

SPECIFIC DESCRIPTION

Figure 1:
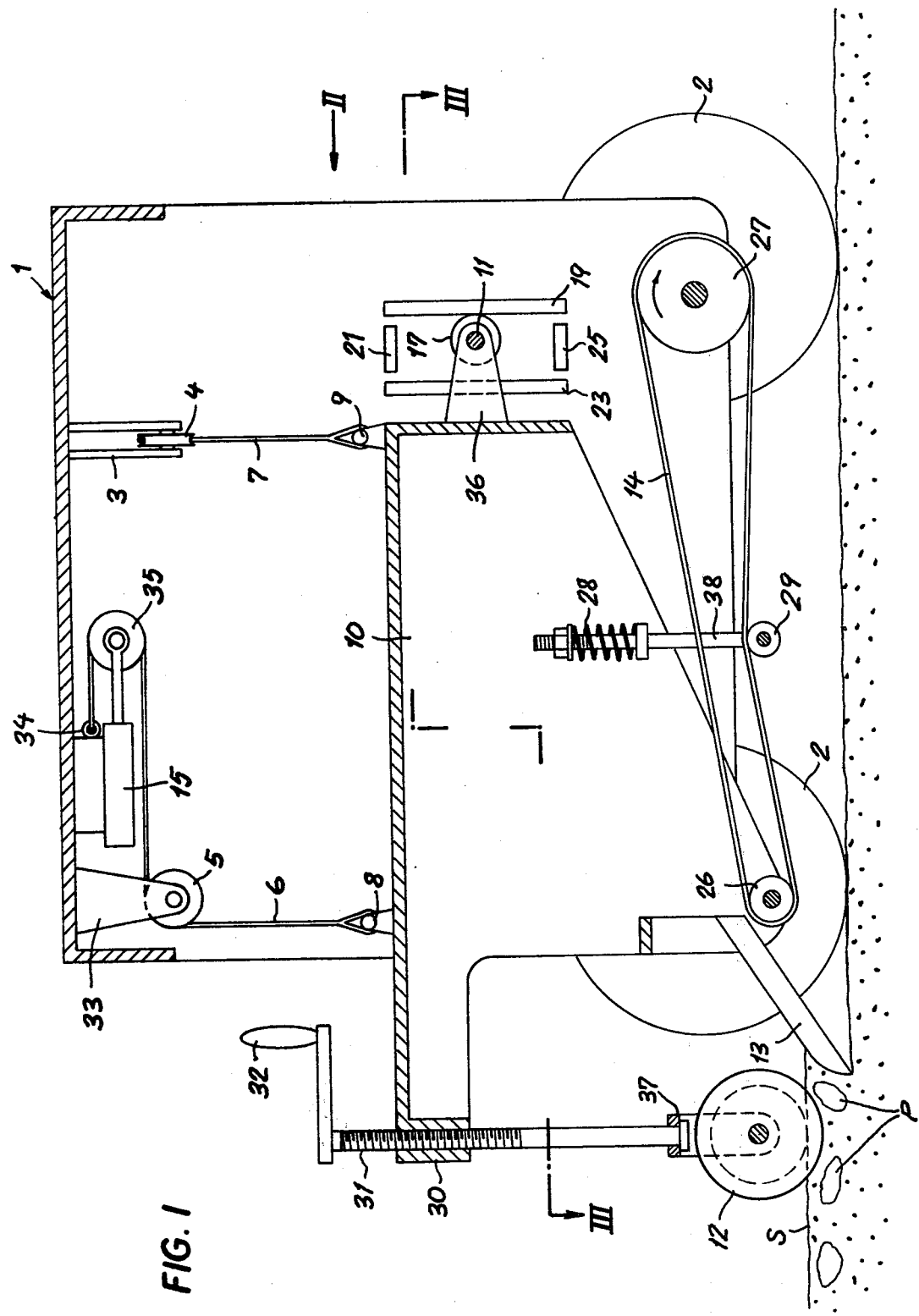
FIG. 1 is an elevational view, in longitudinal section, of an agricultural vehicle equipped with a potato-digging assembly according to our invention.

In the drawing we have shown an agricultural vehicle, here designed as a trailer, whose forwardly and rearwardly open body 1 rides on terrain-going wheels 2 along furrow slices or ridges S separated by furrows F. A frame 10 is suspended within vehicle body 1 by two cables 6 and 7, the former being anchored to a lug 8 on a forward part of the frame whereas the latter engages two lugs 9 disposed at opposite sides on its rear. Cable 7 passes in a transverse plane about two idler rollers 4 journaled in brackets 3 which are secured to the ceiling of the vehicle. Cable 6 rises more or less vertically from lug 8, passes about a deflecting roller 5 which is journaled in a bracket 33, and is anchored at 34 to the frame 1. A hydraulic jack 15 secured to the vehicular ceiling carries a tension roller 35 which engages the cable 6 to elevate the frame 10 above its illustrated working position.

Frame 10 is provided with a pair of rearwardly extending brackets 36 carrying a transverse axle 11 on which two guide rollers 16 and 17 are freely rotatable. The front end of the frame forms a nut 30 for a leadscrew 31 provided with a crank 32, the lower end of that leadscrew being free to turn in a yoke 37 which is held against rotation by a pair of upright bars 38 sliding freely in respective bores of the frame. Yoke 37 carries three pilot wheels 12 which ride respective furrow slices S and whose elevation relative to the frame 10 is adjustable with the aid of the crank 32; with a given adjustment, these pilot wheels determine the depth of penetration of respective plows 13, also mounted on the front end of the frame, into the respective furrow slices.

An endless screen conveyor 14 embraces a pair of rollers 26 and 27, the front roller 26 being idly mounted on frame 10 just behind the plows 13 whereas the rear roller 27 has its shaft journaled in vehicle body 1; the latter shaft may be driven by a nonillustrated motor or may be coupled with the rear wheels 2 for rotation during movement of the vehicle. Conveyor 14 is tensioned by another idler roller 29 on a yoke 38 which is biased upwardly by a pair of coil springs 28 anchored to the sidewalls of the frame 10. Conveyor 14 passes well below the level of transverse axle 11 carrying the guide rolles 16 and 17.

Figure 2:
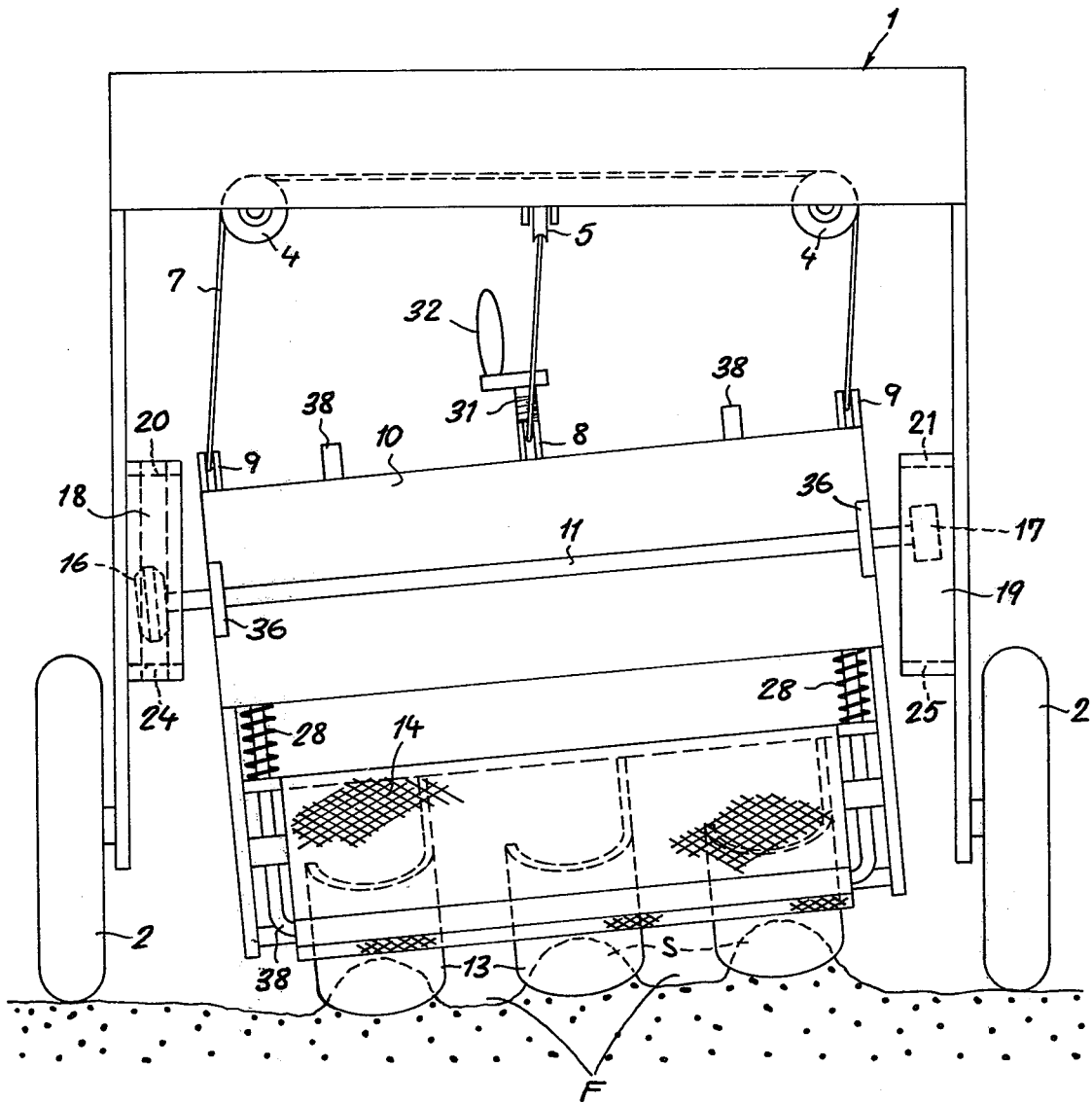
FIG. 2 is a rear view as seen in the direction II of FIG. 1.
Figure 3:
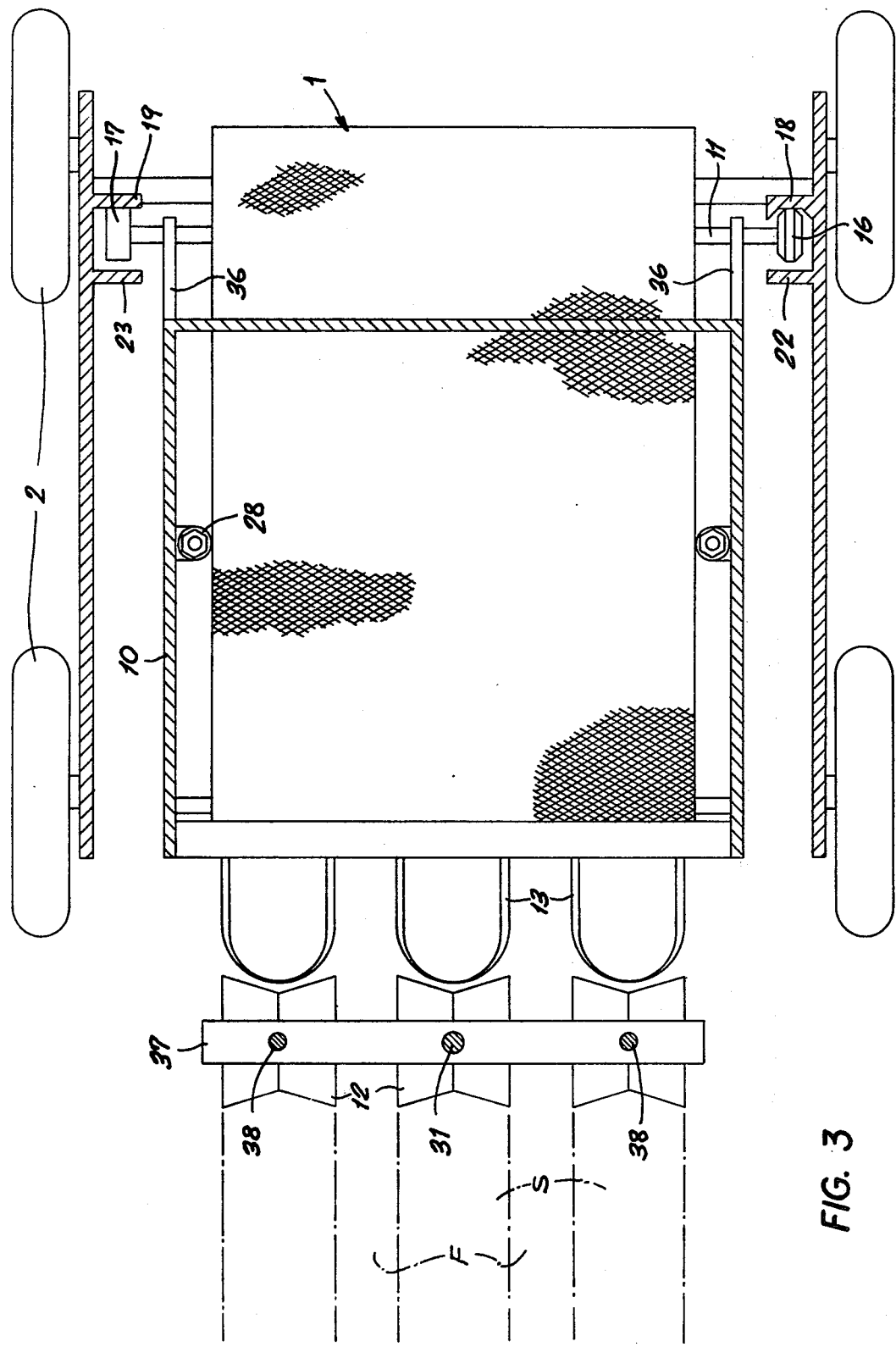
FIG. 3 is a cross-sectional view taken on the line III — III of FIG. 1.

Roller 16, whose rim has a trapezoidal profile, is bracketed with clearance by two vertical track members 18 and 22. The rear track member 18 has a pair of beveled cheeks whose confronting surfaces are generally parallel to the inclined flanks of the roller rim but whose spacing is greater than the rim width, thereby allowing the roller 16 and with it the frame 10 to shift laterally to a limited extent upon, say, a deflection of one of the plows 13 by a stone in its path. The opposite track member 22 limits the forward movement of that roller which therefore cannot escape from its guide track even when the frame is sharply tilted, as illustrated in FIG. 2. Roller 17, on the other hand, is flat-rimmed and coacts with two planar track members 19 and 23, similar to member 22, whose spacing is substantially the same as that of members 18 and 22 and which merely limit the longitudinal displacement of the frame with reference to body 1. The two guide rollers are further confined in a vertical direction by upper abutments 20, 21 and lower abutments 24, 25. The width of track members 19 and 23 is, of course, sufficient to allow for a lateral excursion of roller 17 consistent with the greatest tilt angle.

In operation, as will be readily apparent, plows 13 dig up respective furrow slices S and load the extracted potatoes P onto the moving conveyor 14, the accompanying soil dropping through the meshes of its screen. The three pilot wheels 12 orient the plows along with the frame 10 according to the terrain so that the full width of the conveyor can be utilized for transporting the crop. Stretching roller 29 yieldably resists any forward motion of the frame relative to the vehicle body, thus urging the rollers 16 and 17 into contact with their rear track members 18 and 19.

If a bump in the path of one of the vehicle wheels 2 causes the body 1 to sway momentarily to one side or the other, the frame 10 will still maintain its terrain-hugging position thanks to its relative mobility and the action of the three pilot wheels 12.

We claim:

1. An implement for the harvesting of root crops buried in furrow slices, comprising:
   a vehicle displaceable in the direction of said furrow slices, said vehicle having a forwardly open body;
   a generally horizontal frame within said body having a front end projecting from said body;
   three-point suspension means in said body holding said frame with limited realtive freedom of motion in any direction, said suspension means including a transverse first cable anchored to opposite sides of a rear part of said frame, idler means in said body above said frame engaged by said first cable enabling said frame to tilt about a generally horizontal longitudinal axis, and a second cable longitudinally spaced from said first cable rising from a forward part of said frame and anchored to said body thereabove;
   a plurality of parallel plows on said front end adapted to dig up respective furrow slices;
   a screen conveyor extending rearwardly from said plows at the bottom of said frame;
   a plurality of pilot wheels on said front end disposed ahead of said plows for riding said furrow slices; and
   a lost-motion coupling between said frame and said body restricting the relative mobility thereof in at least the longitudinal and transverse directions.

2. An implement as defined in claim 1 wherein said lost-motion coupling comprises a pair of guide rollers on said frame and a pair of generally vertical tracks on said body bracketing said guide rollers with clearance.

3. An implement as defined in claim 2 wherein said guide rollers are disposed on said rear part of said frame.

4. An implement as defined in claim 2 wherein one of said guide rollers has a rim with a radially outwardly converging flanks, the track bracketing said one of said guide rollers having a pair of relatively inclined cheeks generally paralleling said flanks.

5. An implement as defined in claim 4 wherein the other of said guide rollers has a substantially cylindrical rim.

6. An implement as defined in claim 2 wherein said lost-motion coupling further comprises abutments limiting the vertical displacement of said guide rollers along said tracks.

7. An implement as defined in claim 1, further comprising tensioning means engaging said second cable for adjusting the elevation of said front end with reference to said body.

8. An implement as defined in claim 7 wherein said tensioning means comprises an hydraulic jack.

9. An implement as defined in claim 1 wherein said screen conveyor is provided with a front roller mounted on said frame, a rear roller mounted on said body and stretching means urging said rollers toward each other.

10. An implement as defined in claim 1 wherein the number of said plows and the number of said pilot wheels is three.

* * * * *